United States Patent
Dix (10) Patent No.: US 7,841,621 B2
(45) Date of Patent: Nov. 30, 2010

(54) TETHER GUIDED INFLATABLE SAIL PANEL (75) Inventor: Jeffery Carl Dix, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 12/790,096

(22) Filed: May 28, 2010

(65) Prior Publication Data

US 2010/0237597 A1    Sep. 23, 2010

Related U.S. Application Data (63) Continuation of application No. 11/540,800, filed on Sep. 29, 2006, now Pat. No. 7,762,578.

(51) Int. Cl.
*B60R 21/213* (2006.01)
*B60R 21/237* (2006.01)

(52) U.S. Cl. .................. 280/730.2; 280/743.2

(58) Field of Classification Search ............. 280/730.2, 280/743.2; B60R 21/213, 21/237
See application file for complete search history.

(56) References Cited

U.S. PATENT DOCUMENTS

| | | | |
|---|---|---|---|
| 6,176,515 B1 | 1/2001 | Wallner et al. | |
| 6,234,516 B1 | 5/2001 | Boxey | |
| 6,237,939 B1 | 5/2001 | Resh | |
| 6,361,068 B1 | 3/2002 | Stein et al. | |
| 6,375,216 B1 * | 4/2002 | Eschbach | 280/730.1 |
| 6,428,037 B1 | 8/2002 | Bakhsh et al. | |
| 6,464,250 B1 | 10/2002 | Faigle et al. | |
| 6,471,240 B2 | 10/2002 | Bakhsh et al. | |
| 6,505,853 B2 | 1/2003 | Brannon et al. | |
| 6,565,118 B2 | 5/2003 | Bakhsh et al. | |
| 6,634,671 B2 | 10/2003 | Heigl et al. | |
| 6,637,769 B2 | 10/2003 | Peer et al. | |
| 6,695,347 B2 | 2/2004 | Sonnenberg et al. | |
| 6,758,490 B2 | 7/2004 | Hoeft et al. | |
| 6,851,707 B2 | 2/2005 | Bakhsh et al. | |
| 6,945,558 B2 * | 9/2005 | Hall et al. | 280/730.2 |
| 7,044,500 B2 | 5/2006 | Kalandek et al. | |
| 7,325,826 B2 | 2/2008 | Noguchi et al. | |
| 7,654,560 B2 * | 2/2010 | Yokoyama et al. | 280/729 |
| 2002/0175502 A1 | 11/2002 | Tesch et al. | |
| 2004/0164530 A1 * | 8/2004 | Sunabashiri | 280/730.2 |
| 2010/0013203 A1 * | 1/2010 | Mitchell et al. | 280/743.2 |
| 2010/0225097 A1 * | 9/2010 | Trovato et al. | 280/730.2 |

* cited by examiner

*Primary Examiner*—Paul N. Dickson
*Assistant Examiner*—Joselynn Y. Sliteris
(74) *Attorney, Agent, or Firm*—Young Basile (57) ABSTRACT

An airbag assembly can include a side curtain airbag having an inflatable curtain portion and an inflatable sail portion, and a first fold of the sail portion with respect to the curtain portion prior to folding the side curtain airbag into a stowed condition for installation in the vehicle. The curtain portion is disposed rearward of the first fold and the sail portion is disposed at least partially forward of the first fold. A tether has a first end attached to the side curtain airbag rearward of the first fold and a second end attachable to a structural pillar of the vehicle for guiding a direction of expansion of the sail portion during inflation.

19 Claims, 6 Drawing Sheets

TETHER GUIDED INFLATABLE SAIL PANEL

CROSS-REFERENCE TO RELATED APPLICATIONS

This application is a continuation of U.S. patent application Ser. No. 11/540,800, filed on Sep. 29, 2006, now U.S. Pat. No. 7,762,578.

FIELD OF THE INVENTION

The present invention relates to an inflatable airbag curtain, and more specifically to a tether guided inflatable sail panel portion of a side curtain airbag to be deployed downward along an inner side surface of a passenger compartment of a vehicle.

BACKGROUND

Inflatable safety restraint devices or airbags, are standard equipment on most new vehicles. Front airbag modules can be located in the steering wheel on a driver side of the vehicle and in a dashboard on a passenger side of the vehicle. Side impact airbag systems can also be provided as either optional equipment or as standard equipment on new vehicles. Side airbags can be installed in a stowed condition adjacent a roof rail of a vehicle in order to be inflated to a deployed condition extending downwardly along an inner side surface of a passenger compartment of the vehicle. Front and side airbag modules can be deployed using expanding gases from an explosive charge contained within an inflator, sometimes referred to as a pyrotechnic inflator, or can be inflated by a stored gas inflator, both of which are conventional. Expanding gases travel through conduits and fill each airbag chamber to protect the vehicle occupants from harmful impact with interior portions of the vehicle. Side curtain airbags can be attached to a roof rail of a vehicle adjacent a joint between the headliner and the upper portion of the pillars supporting the roof. Typically, the side curtain airbags deploy vertically downward from the roof rail position. Various side curtain configurations have been disclosed, for example see U.S. Pat. No. 7,044,500; U.S. Pat. No. 6,758,490; and Patent Application Publication No. US 2005/0140125.

SUMMARY

It would be desirable to provide a side curtain airbag with an inflatable sail panel extending forwardly toward an "A" pillar of a vehicle. It would be desirable to provide a tether guide for guiding inflation of a forwardly extending inflatable sail panel portion of a side curtain airbag in a motor vehicle.

An airbag assembly can include a side curtain airbag having an inflatable curtain portion and an inflatable sail portion, and a first fold of the sail portion with respect to the curtain portion prior to folding the side curtain airbag into a stowed condition for installation in the vehicle. The curtain portion is disposed rearward of the first fold and the sail portion is disposed at least partially forward of the first fold. A tether has a first end attached to the side curtain airbag rearward of the first fold and a second end attachable to a structural pillar of the vehicle for guiding a direction of expansion of the sail portion during inflation.

The airbag assembly of claim could include a foremost attachment point of the side curtain airbag with respect to the vehicle, wherein the curtain portion is disposed rearward of the foremost attachment point and the sail portion is disposed forward of the foremost attachment point. The first fold could be forward of the foremost anchor point.

The sail portion could be operably engaged with the tether forward of first fold for guiding the direction of expansion of the sail portion during inflation.

A first aperture could be formed through the side curtain airbag forward of the first fold, wherein the side curtain airbag is operably engaged with the tether at the first aperture for guiding the direction of expansion of the sail portion during inflation.

The sail portion could include a first inflatable chamber portion disposed between the first aperture and the first fold. The first inflatable chamber portion could be configured such that an upper end of the first inflatable chamber portion extends above the first aperture. The sail portion could include a second inflatable chamber portion disposed below the first aperture and fluidly coupling the first inflatable chamber portion of the sail portion to the inflatable curtain portion.

A second aperture could be formed through the side curtain airbag and positioned such that the first fold is disposed between the first aperture and the second aperture, wherein the side curtain airbag is operably engaged with the tether at the second aperture for guiding the direction of expansion of the sail portion during inflation. The side curtain airbag could further include first and second eyelets that define the first aperture and the second aperture, respectively.

The side curtain airbag could be non-inflatable directly adjacent to the first aperture, the second aperture, and the first end of the tether.

The sail portion could include a first inflatable chamber portion that is disposed between the first and second apertures and an upper end of the first inflatable chamber extends above the first aperture. The sail portion could include a second inflatable chamber portion that is disposed below the first aperture.

The tether could include a central portion between the first and second ends, wherein the first end of the tether is attached on a first side of the side curtain airbag and the central portion is disposed on a second side of the side curtain airbag opposite the first side of the side curtain airbag. The first side of the side curtain airbag could be an outboard side of the side curtain airbag and the second side of the side curtain airbag could be an inboard side of the side curtain airbag when the side curtain airbag is inflated.

The airbag assembly could include a second fold of the sail portion with respect to the curtain portion prior to folding the side curtain airbag into a stowed condition for installation in the vehicle, wherein the first fold and the second fold cooperate to define a Z-shaped fold of the of the sail portion with respect to the curtain portion. The airbag assembly could further include an accordion fold of the side curtain airbag into a stowed condition for installation in the vehicle. Alternatively, the airbag assembly could include a roll fold of the side curtain airbag into a stowed condition for installation in the vehicle. As another alternative, the airbag assembly could include a combination of an accordion fold and a roll fold of the side curtain airbag into a stowed condition for installation in the vehicle.

The first fold of the side curtain airbag could be generally vertically oriented with respect to the vehicle when the sail portion is inflated.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Referring now to FIGS. 1-4, a side curtain airbag 10 for installation in a stowed condition proximate a roof rail 12 of a vehicle 14 and to be inflated to a deployed condition extending downward along an inner side surface 16 of a passenger compartment 18 of the vehicle 14 is illustrated. The side curtain airbag 10 can include at least one expandible chamber 20 having an inflatable curtain portion 22 and an inflatable sail portion 24 extending forwardly from a foremost anchor point 26 of the curtain portion 22 with respect to the vehicle 14. A tether 28 can be attached to the expandible chamber 20 at one end 30 and can be attachable to a structural pillar 32 of the vehicle 14 at opposite end 34 for guiding a direction of expansion of the sail portion 24 during inflation.

The side curtain airbag 10 can include at least one eyelet 36, 38 associated with the sail portion 24 and operably engaged with the tether 28 for guiding the direction of expansion of the sail portion 24 during inflation. An anchor 40 at one end 30 of the tether 28 can be connected to the curtain portion 22 of the expandible chamber 20. A Z-fold 42 of the sail portion 24 with respect to the curtain portion 22 can be provided in the side curtain airbag 10 prior to folding the curtain portion 22 into a stowed condition for installation in the vehicle 14.

Figure 1:
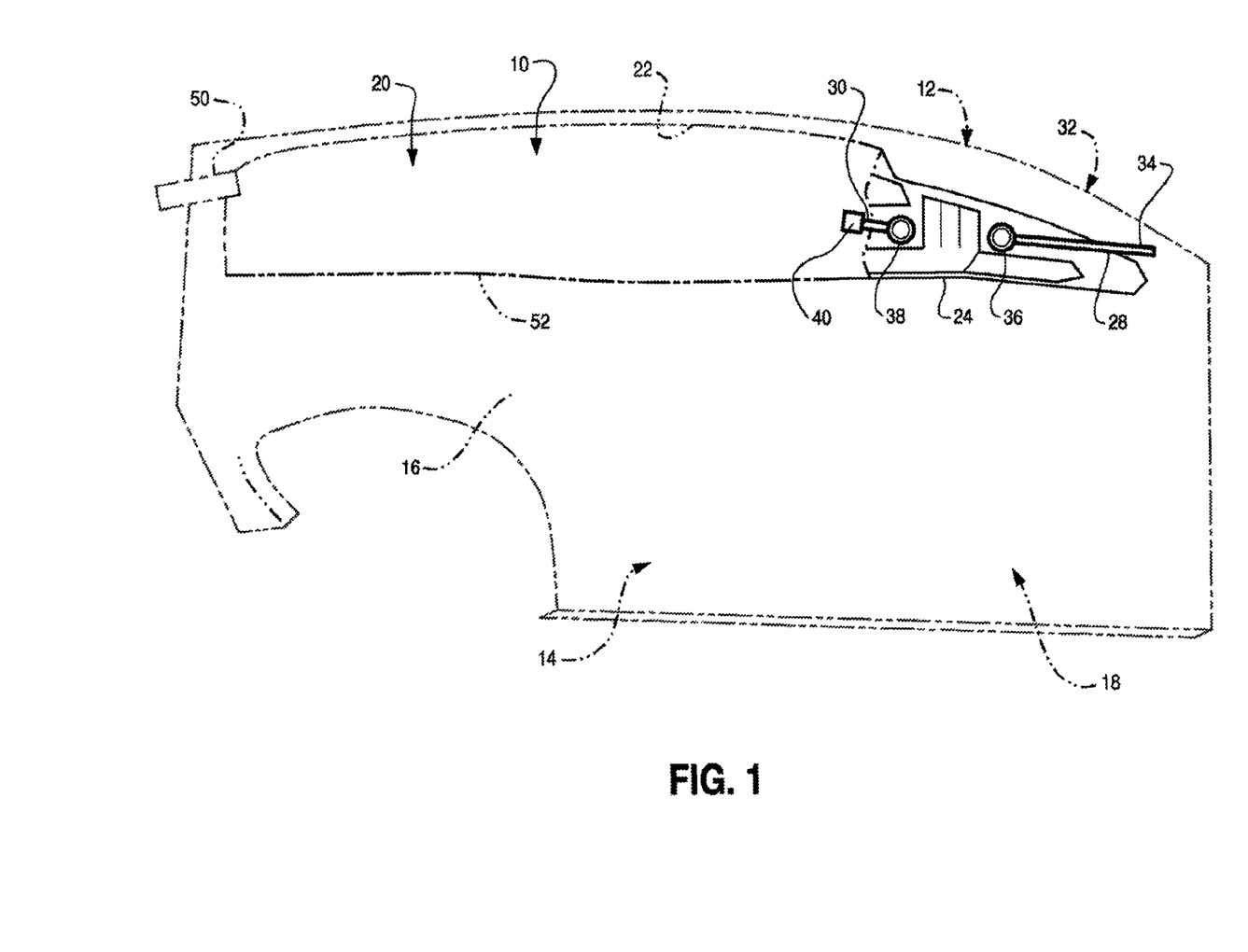
FIG. 1 is a simplified schematic view of an inner side surface of a passenger compartment of a vehicle shown in phantom, a conventional inflator and downwardly extending side curtain portion also shown in phantom, and an inflatable sail portion extending forwardly from a foremost anchor point of the curtain portion according to an embodiment of the present invention with a tether attached to an expandible chamber of the side curtain airbag at one end and attachable to a structural pillar of the vehicle at an opposite end for guiding a direction of expansion of the sail portion during inflation.
Figure 3:
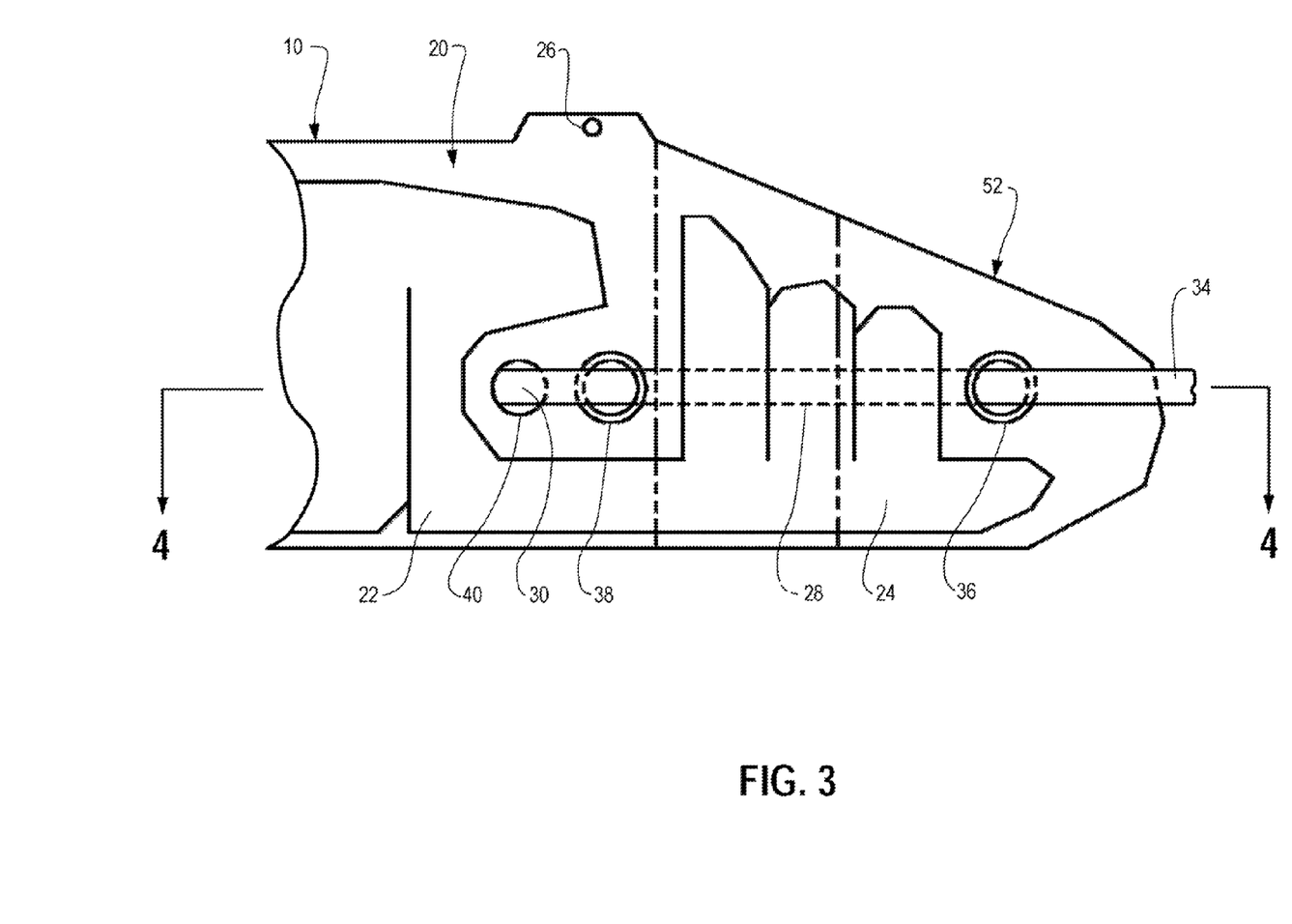
FIG. 3 is a detailed side elevational view of the inflatable sail portion illustrated in FIG. 2 in the deployed condition where the Z-shaped fold of the sail portion has been guided during inflation by a tether operably engaged through first and second eyelets associated with the sail portion.
Figure 5:
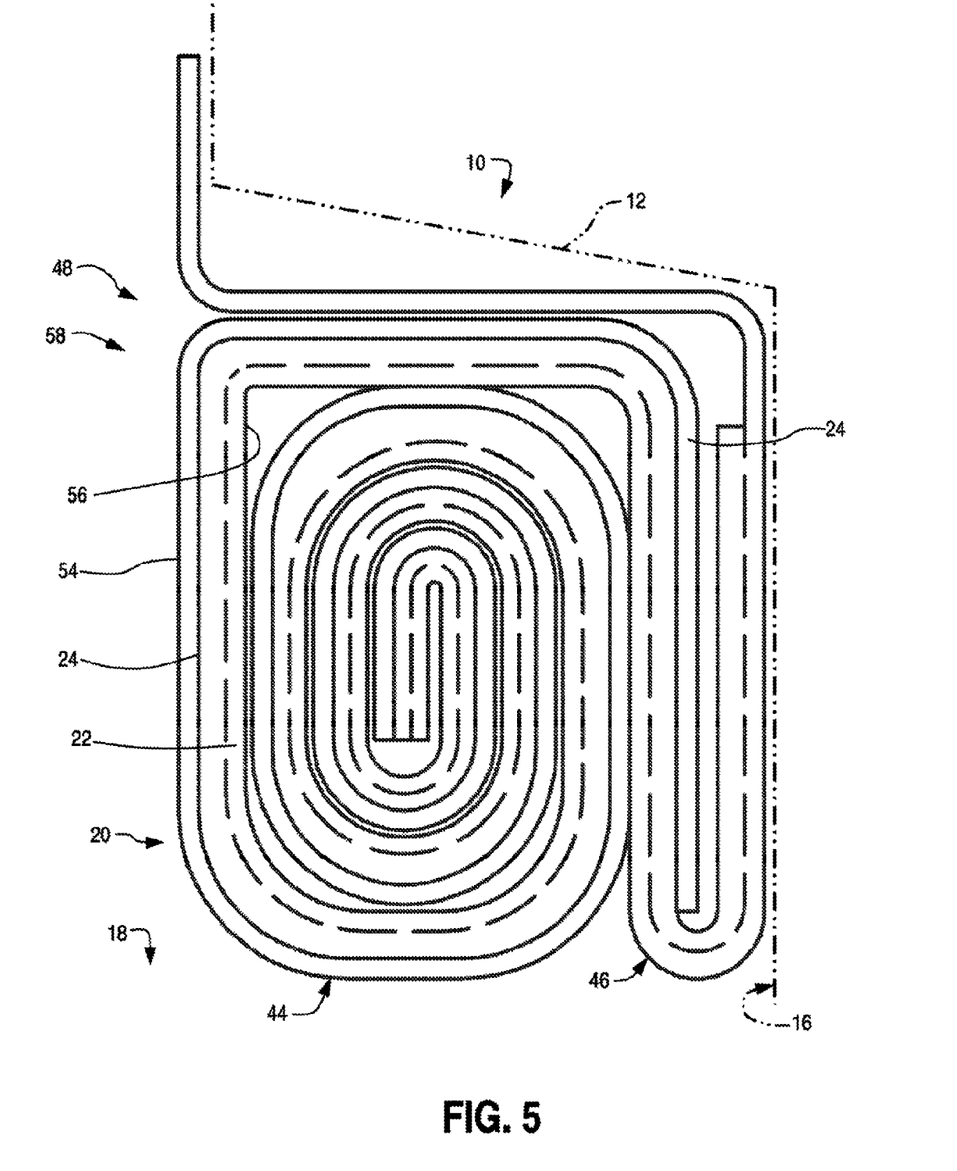
FIG. 5 is a simplified schematic cross-sectional view of a side curtain airbag with inflatable sail portion in a stowed condition using a combination roll fold and accordion fold.

Referring now to FIG. 3, the expandible chamber 20 can include the Z-fold 42 of the sail portion 24 with respect to the curtain portion 22 as best seen in FIG. 5, the Z-folded sail portion 24 and curtain portion 22 can be folded into a stowed condition with a roll fold 44, or a combination of an accordion fold 46 and roll fold 44 into a stowed condition 48 for installation into the vehicle 14 adjacent a roof rail 12. As best seen in FIG. 1, when inflated by an inflator 50, the expandible chamber 20 expands from the stowed condition 48 to a deployed condition 52 generally in front of an adjacent side 16 of the vehicle 14. The sail portion 24 extends forwardly from a forward most anchored point 26 of the curtain portion 22 with respect to the roof rail 12 of the vehicle 14.

Figure 6:
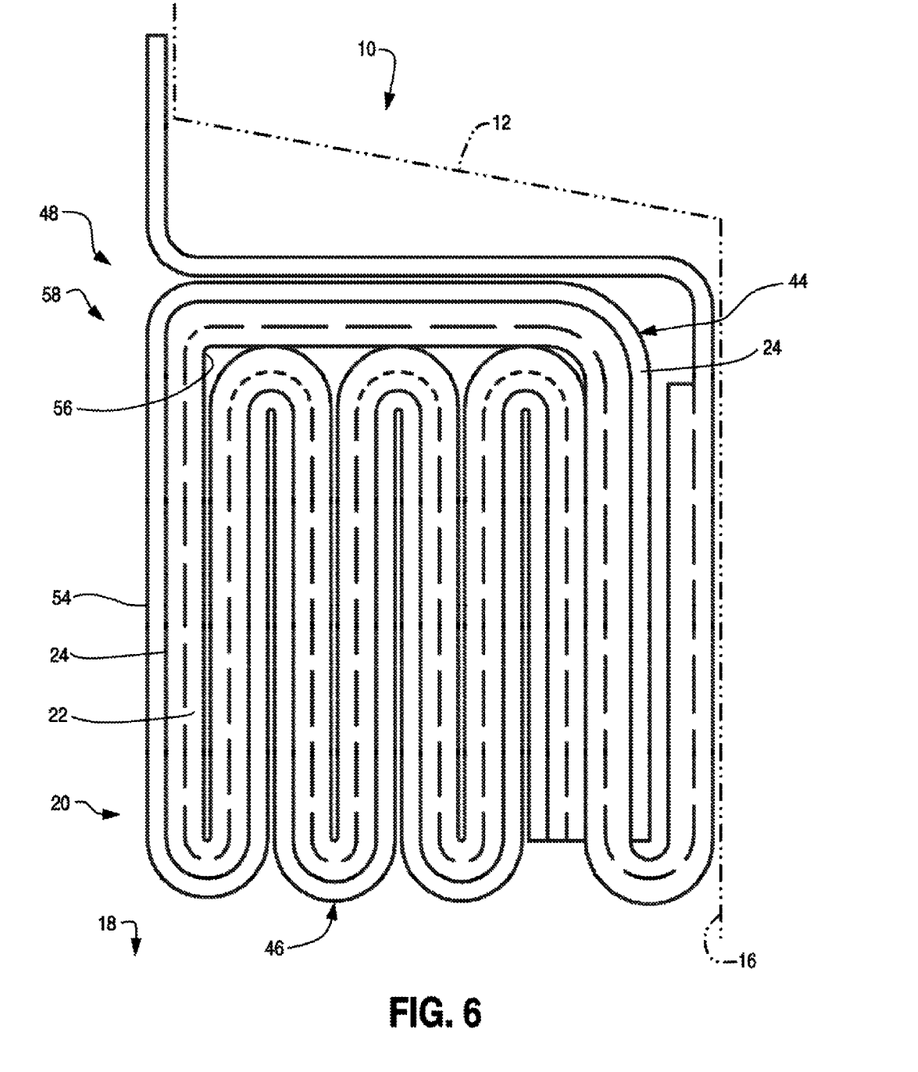
FIG. 6 is a simplified schematic cross-sectional view of a side curtain airbag with inflatable sail portion in a stowed condition using an accordion fold.

Referring now to FIG. 6, an accordion fold 46 of the expandible chamber 20, including the curtain portion 22 and sail portion 24, can be performed in order to place the chamber 20 in a stowed condition 48 for installation in the vehicle 14. The expandible chamber 20 including the Z-fold 42 of the sail portion 24 with respect to the curtain portion 22 can be folded into a stowed condition with an accordion fold 46 or a combination of an accordion fold 46 and roll fold 44 into a stowed condition 48 for installation into the vehicle 14 adjacent a roof rail 12. As best seen in FIG. 1, when inflated by an inflator 50, the expandible chamber 20 expands from the stowed condition 48 to a deployed condition 52 extending in front of an adjacent side 16 of the vehicle 14. The sail portion 24 extends forwardly from a forward most anchored point 26 of the curtain portion 22 with respect to the roof rail 12 of the vehicle 14.

Figure 2:
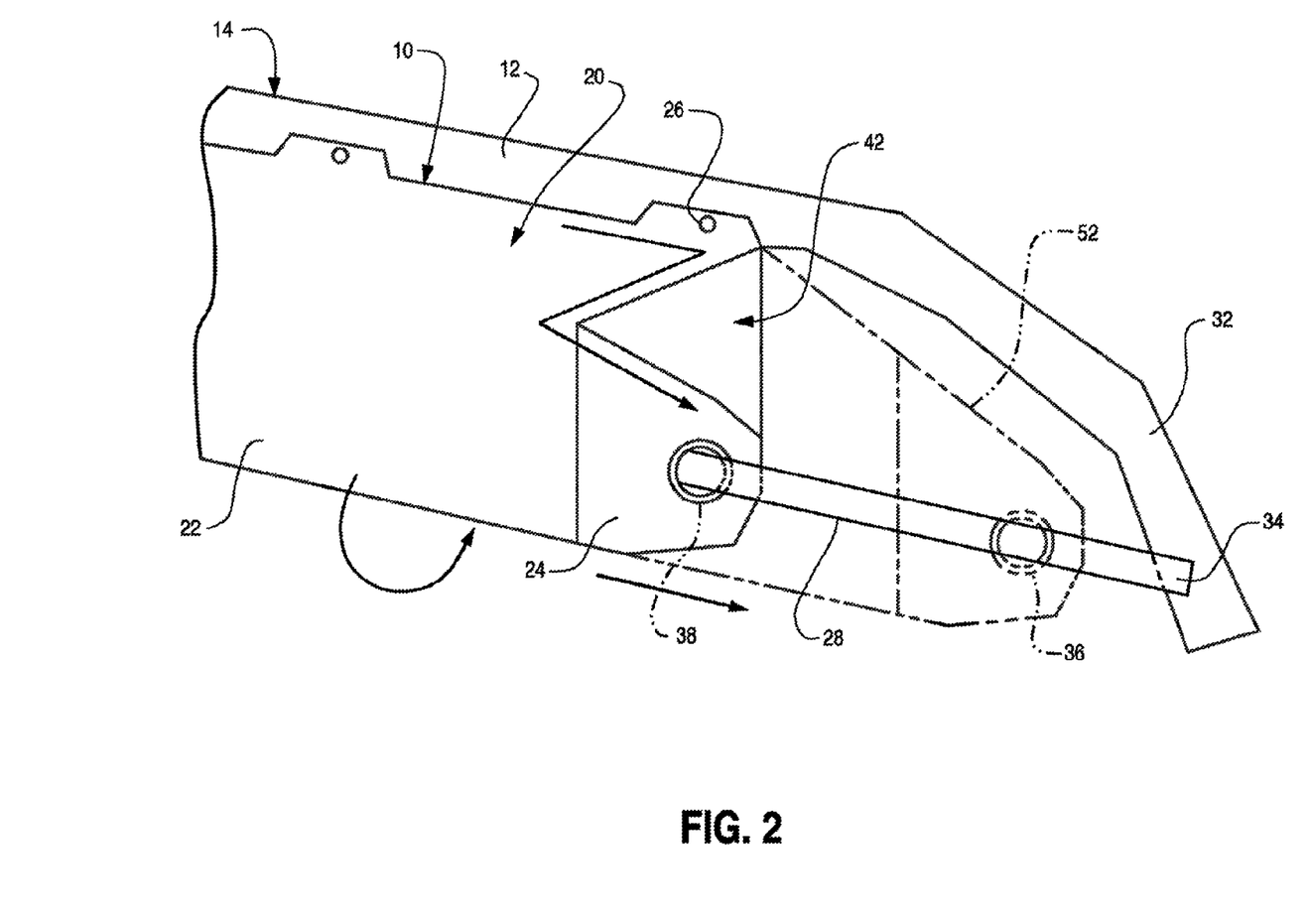
FIG. 2 is a detailed view of the inflatable sail portion according to an embodiment of the present invention illustrating a Z-shaped fold of the sail portion with respect to the curtain portion prior to folding the curtain portion into a stowed condition for installation in the vehicle with a tether extending through at least one eyelet associated with the sail portion for guiding the direction of expansion of the sail portion during inflation.
Figure 4:
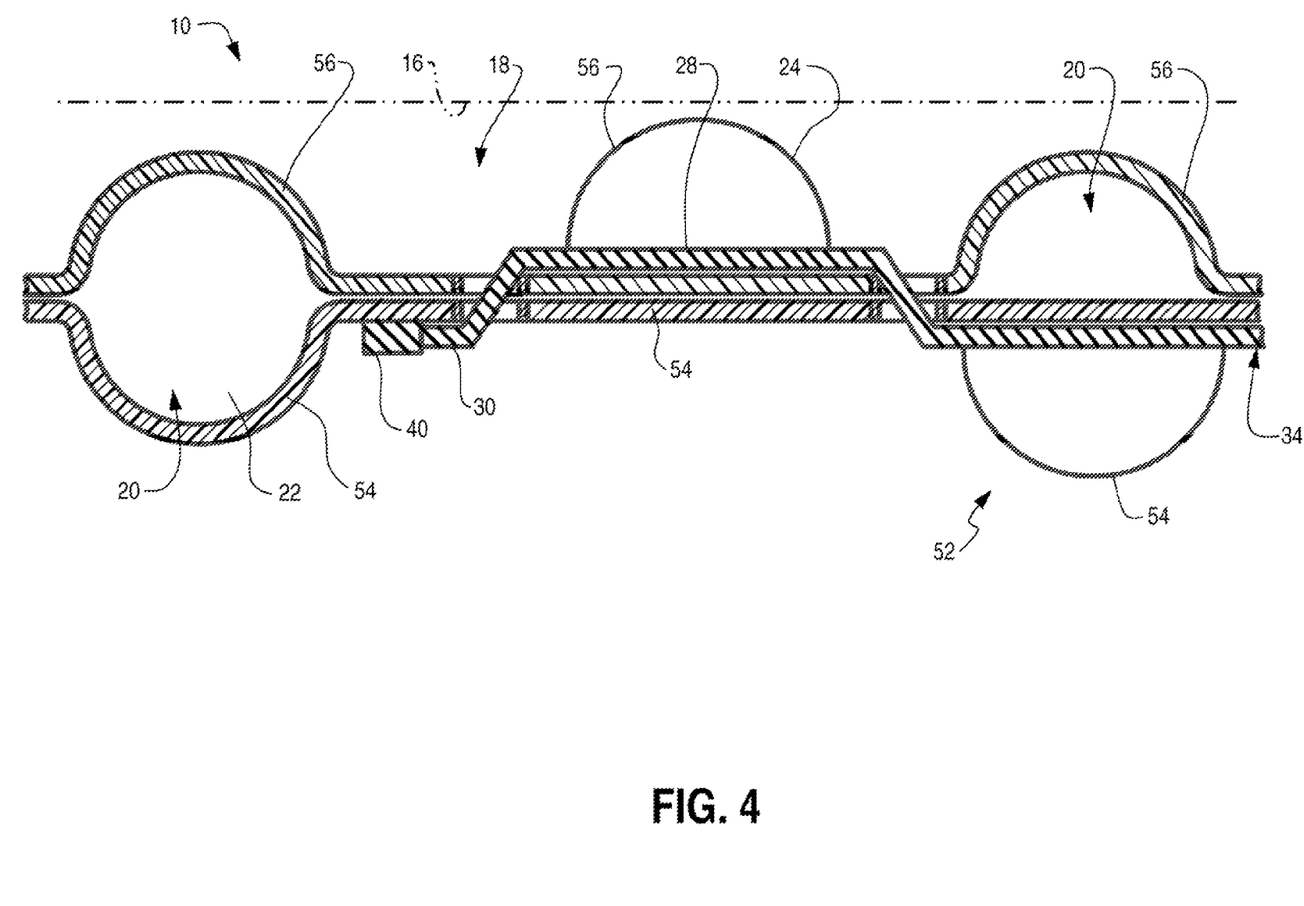
FIG. 4 is a cross-sectional view taken as shown in FIG. 3.

Referring now to FIGS. 2-4, the guide tether 28 can be connected or anchored to the curtain portion at one end 30 and can extend through one or more eyelets 36, 38 along a longitudinal length of the tether 28 to an opposite end 34. The opposite end 34 is configured to be connected with a structural pillar 32 of the vehicle 14. During inflation of the expandible chamber, the curtain portion 22 and sail portion 24 are unfolded from the stowed condition 48 during inflation, while moving toward the deployed condition 52. The sail portion is guided during inflation by the eyelet 36, 38 moving along the longitudinal length of the tether 28 from the anchor end 30 adjacent the curtain portion toward the opposite end 34 secured to a structural pillar 32 of the vehicle 14. The sail portion 24 expands in a forward direction from the foremost anchor point of the curtain portion 22 of the inflatable chamber 20. When fully extended in the forward direction of the deployed condition 52, the sail portion appears as illustrated in FIGS. 1 and 3, and the cross section of FIG. 4. During preparation of the expandible chamber 20, while being folded into the stowed condition 48, a Z-shape fold 42 can be performed as illustrated in FIG. 2 in order to fold the sail portion 24 in overlying relationship with respect to the curtain portion 22 of the expandible chamber 20. The Z-fold 42 illustrated in FIG. 2 slides the one or more eyelets 36, 38 along the longitudinal length of the tether 28 toward the anchor end 30.

As best seen in FIG. 4, a side curtain airbag 10 for installation in a stowed condition 48 adjacent a roof rail 12 of a vehicle 14 can be inflated as best seen in FIG. 1 to a deployed condition 52 extending downward along an inner side surface 16 of a passenger compartment 18 of the vehicle 14. The side curtain airbag 10 can include an expandible chamber 20 defined by an inboard flexible side panel 54 and an outboard flexible side panel 56. The expandible chamber 20 forms an inflatable curtain portion 22 and an inflatable sail portion 24. The sail portion 24 can extend forwardly from a foremost anchor point 26 of the curtain portion 22 with respect to the vehicle 14. A Z-shaped fold portion 42 can be used to position the sail portion 24 to be in an overlying relationship with respect to the inboard side panel 54 of the curtain portion 22. A fold portion 58, such as a roll fold 44, accordion fold 46, or any combination thereof can be applied to the curtain and overlying sail portion 22, 24, after the Z-shaped fold 42, in order to locate the inboard side panel 54 of the inflatable chamber 20 facing inboard with respect to the vehicle 14 when in a stowed condition 48.

According to an embodiment of the present invention, a method or process for folding a side curtain airbag 10 for installation in a stowed condition 48 adjacent a roof rail 12 of a vehicle 14 can be performed in order to place the side curtain airbag 10 in suitable condition to be inflated to a deployed condition 52 extending downward along an inner side surface 16 of a passenger compartment 18 of the vehicle 14. The method or process can include forming an expandible chamber 20 defined by an inboard side flexible panel 54 and an outboard side flexible panel 56. The chamber 20 forms an inflatable curtain portion 22 and an inflatable sail portion 24. The sail portion 24 extends forwardly from a foremost anchor point 26 of the curtain portion 22 with respect to the vehicle 14. The method or process can include positioning the sail portion 24 to be in an overlying relationship with respect to the inboard side panel 54 of the curtain portion 22 with a Z-shaped fold 42. The method or process can include locating the inboard side panel 54 of the chamber 20 facing inboard with respect to the vehicle 14 when in a stowed position 48 with a fold portion 58 of the combined curtain and overlying sail portions 22, 24. The fold portion can be selected from a group consisting of accordion fold 46, a roll fold 44, and any combination thereof.

The method or process can also include attaching a tether 28 to the expandible chamber 20 at one end 30 and having an opposite end 34 attachable to a structural pillar 32 of the vehicle 14 for guiding a direction of expansion of the sail portion 24 during inflation. The method or process can include threading the tether 28 through at least one eyelet 36, 38 associated with the sail portion 24 for guiding the direction of expansion of the sail portion 24 during inflation.

In operation, activation of the inflator 50 begins expansion of the expandible chamber 20 from the folded, stowed condition 48. Expansion of the chamber 20 applies sufficient pressure to the headliner joint adjacent the roof rail 12, causing separation of the headliner to provide a sufficient gap for passage of the side curtain airbag 10. Further inflation of the side curtain airbag 10 causes unfolding, generally vertical, downward deployment of the side curtain airbag 10 along the inner side surface 16 of the passenger compartment 18. When sufficiently unfolded in a vertically downward direction, additional inflation of chamber 20 causes unfolding of the Z-shaped fold 42 and deployment of the sail portion 24 in a forward direction with respect to the vehicle extending toward the structural pillar 32 located forward of the forwardmost anchor point 26 of the inflatable curtain portion 22 of the side curtain airbag 10. The tether 28 guides the inflation direction of the sail portion 24 as eyelets 36, 38 slide along the tether 28 during unfolding inflation of the sail portion 24.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An airbag assembly, comprising:
    a side curtain airbag having an inflatable curtain portion and an inflatable sail portion;
    a first fold of the sail portion with respect to the curtain portion prior to folding the side curtain airbag into a stowed condition for installation in a vehicle, wherein the curtain portion is disposed rearward of the first fold and the sail portion is disposed at least partially forward of the first fold;
    a tether having a first end attached to the side curtain airbag rearward of the first fold and a second end attachable to a structural pillar of the vehicle for guiding a direction of expansion of the sail portion during inflation; and
    a first aperture formed through the side curtain airbag forward of the first fold, wherein the side curtain airbag is operably engaged with the tether at the first aperture for guiding the direction of expansion of the sail portion during inflation.

2. The airbag assembly of claim 1, further comprising:
    a foremost attachment point of the side curtain airbag with respect to the vehicle, wherein the curtain portion is disposed rearward of the foremost attachment point and the sail portion is disposed forward of the foremost attachment point.

3. The airbag assembly of claim 2, wherein the first fold is forward of the foremost anchor point.

4. The airbag assembly of claim 1, wherein the sail portion is operably engaged with the tether forward of first fold for guiding the direction of expansion of the sail portion during inflation.

5. The airbag assembly of claim 1, wherein the sail portion includes a first inflatable chamber portion disposed between the first aperture and the first fold.

6. The airbag assembly of claim 5, wherein an upper end of the first inflatable chamber portion extends above the first aperture.

7. The airbag assembly of claim 5, wherein the sail portion includes a second inflatable chamber portion disposed below the first aperture and fluidly coupling the first inflatable chamber portion of the sail portion to the inflatable curtain portion.

8. The airbag assembly of claim 1 further comprising:
    a second aperture formed through the side curtain airbag and positioned such that the first fold is disposed between the first aperture and the second aperture, wherein the side curtain airbag is operably engaged with the tether at the second aperture for guiding the direction of expansion of the sail portion during inflation.

9. The airbag assembly of claim 8, further comprising:
    a first eyelet, wherein the first aperture is defined by the first eyelet; and
    a second eyelet, wherein the second aperture is defined by the second eyelet.

10. The airbag assembly of claim 8, wherein the side curtain airbag is non-inflatable directly adjacent to the first aperture, the second aperture, and the first end of the tether.

11. The airbag assembly of claim 8, wherein the sail portion includes a first inflatable chamber portion disposed between the first and second apertures and an upper end of the first inflatable chamber extends above the first aperture.

12. The airbag assembly of claim 11, wherein the sail portion includes a second inflatable chamber portion disposed below the first aperture.

13. The airbag assembly of claim 11, wherein the tether further includes a central portion between the first and second ends, and wherein the first end of the tether is attached on a first side of the side curtain airbag and the central portion is disposed on a second side of the side curtain airbag opposite the first side of the side curtain airbag.

14. The airbag assembly of claim 13, wherein the first side of the side curtain airbag is an outboard side of the side curtain airbag and the second side of the side curtain airbag is an inboard side of the side curtain airbag when the side curtain airbag is inflated.

15. The airbag assembly of claim 1, further comprising:

a second fold of the sail portion with respect to the curtain portion prior to folding the side curtain airbag into a stowed condition for installation in the vehicle, wherein the first fold and the second fold cooperate to define a Z-shaped fold of the sail portion with respect to the curtain portion.

16. The airbag assembly of claim 15 further comprising:

an accordion fold of the side curtain airbag into a stowed condition for installation in the vehicle.

17. The airbag assembly of claim 15 further comprising:

a roll fold of the side curtain airbag into a stowed condition for installation in the vehicle.

18. The airbag assembly of claim 15 further comprising:

a combination of an accordion fold and a roll fold of the side curtain airbag into a stowed condition for installation in the vehicle.

19. The airbag assembly of claim 1, wherein the first fold is generally vertically oriented with respect to the vehicle when the sail portion is inflated.

* * * * *